United States Patent
Eledath et al.

(10) Patent No.: US 11,869,065 B1
(45) Date of Patent: Jan. 9, 2024

(54) SYSTEM AND METHOD FOR VISION-BASED EVENT DETECTION

(71) Applicant: Amazon Technologies, Inc., Seattle, WA (US)

(72) Inventors: Jayakrishnan Kumar Eledath, Kenmore, WA (US); Nikhil Chacko, Seattle, WA (US); Alessandro Bergamo, Seattle, WA (US); Kaustav Kundu, Seattle, WA (US); Marian Nasr Amin George, Seattle, WA (US); Jingjing Liu, Seattle, WA (US); Nishitkumar Ashokkumar Desai, Redmond, WA (US); Pahal Kamlesh Dalal, Seattle, WA (US); Keshav Nand Tripathi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 16/272,420

(22) Filed: Feb. 11, 2019

(51) Int. Cl.
  *G06Q 30/0601* (2023.01)
  *G06V 10/40* (2022.01)
  *G06V 40/20* (2022.01)
  *G06F 18/241* (2023.01)

(52) U.S. Cl.
  CPC ....... *G06Q 30/0633* (2013.01); *G06F 18/241* (2023.01); *G06V 10/40* (2022.01); *G06V 40/28* (2022.01)

(58) Field of Classification Search
  CPC ..... G06Q 30/0601–0645; G06Q 30/80; G06Q 30/0633; G06K 9/00355; G06K 9/46; G06K 9/6268; G06V 10/40; G06V 40/28; G06F 18/241

USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64,
(Continued)

(56) References Cited

U.S. PATENT DOCUMENTS

| | | |
|---|---|---|
| 9,117,106 B2 | 8/2015 | Dedeoglu et al. |
| 9,235,928 B2 | 1/2016 | Medioni et al. |
| 9,473,747 B2 | 10/2016 | Kobres et al. |

(Continued)

OTHER PUBLICATIONS

Liu, J., Gu, Y., & Kamijo, S. (2017). Customer behavior classification using surveillance camera for marketing. Multimedia Tools and Applications, 76(5), 6595-6622. doi:http://dx.doi.org/10.1007/s11042-016-3342-1 (Year: 2017).*

*Primary Examiner* — Matthew E Zimmerman
*Assistant Examiner* — Latasha D Ramphal
(74) *Attorney, Agent, or Firm* — Lee & Hayes, P.C.

(57) ABSTRACT

This disclosure describes systems and techniques for identifying events that occur within an environment using image data captured at the environment. For example, one or more cameras may generate image data representative of a user interacting with an item on the shelf. This image data may be used to generate feature data associated with the user and the item, which may be analyzed by one or more classifiers for identifying an interaction between the user and the item. The systems and techniques may then generate interaction data, which in turn may be analyzed by one or more additional classifiers for identifying an event, such as the user picking a particular item from the shelf within the environment. Event data indicative of the event may then be used to update a virtual cart of the user.

20 Claims, 8 Drawing Sheets

(58) Field of Classification Search
USPC ..... 705/26.7, 26.8, 26.81, 26.82, 26.9, 27.1, 705/27.2
See application file for complete search history.

(56) References Cited

U.S. PATENT DOCUMENTS

| | | |
|---|---|---|
| 10,127,438 B1 | 11/2018 | Fisher et al. |
| 10,133,933 B1 | 11/2018 | Fisher et al. |
| 10,140,820 B1 * | 11/2018 | Zalewski ............. G06Q 20/327 |
| 10,282,720 B1 * | 5/2019 | Buibas ................. G06K 9/627 |
| 2013/0284806 A1 | 10/2013 | Margalit |
| 2019/0045207 A1 * | 2/2019 | Chen ....................... H04L 67/12 |

* cited by examiner

SYSTEM AND METHOD FOR VISION-BASED EVENT DETECTION

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
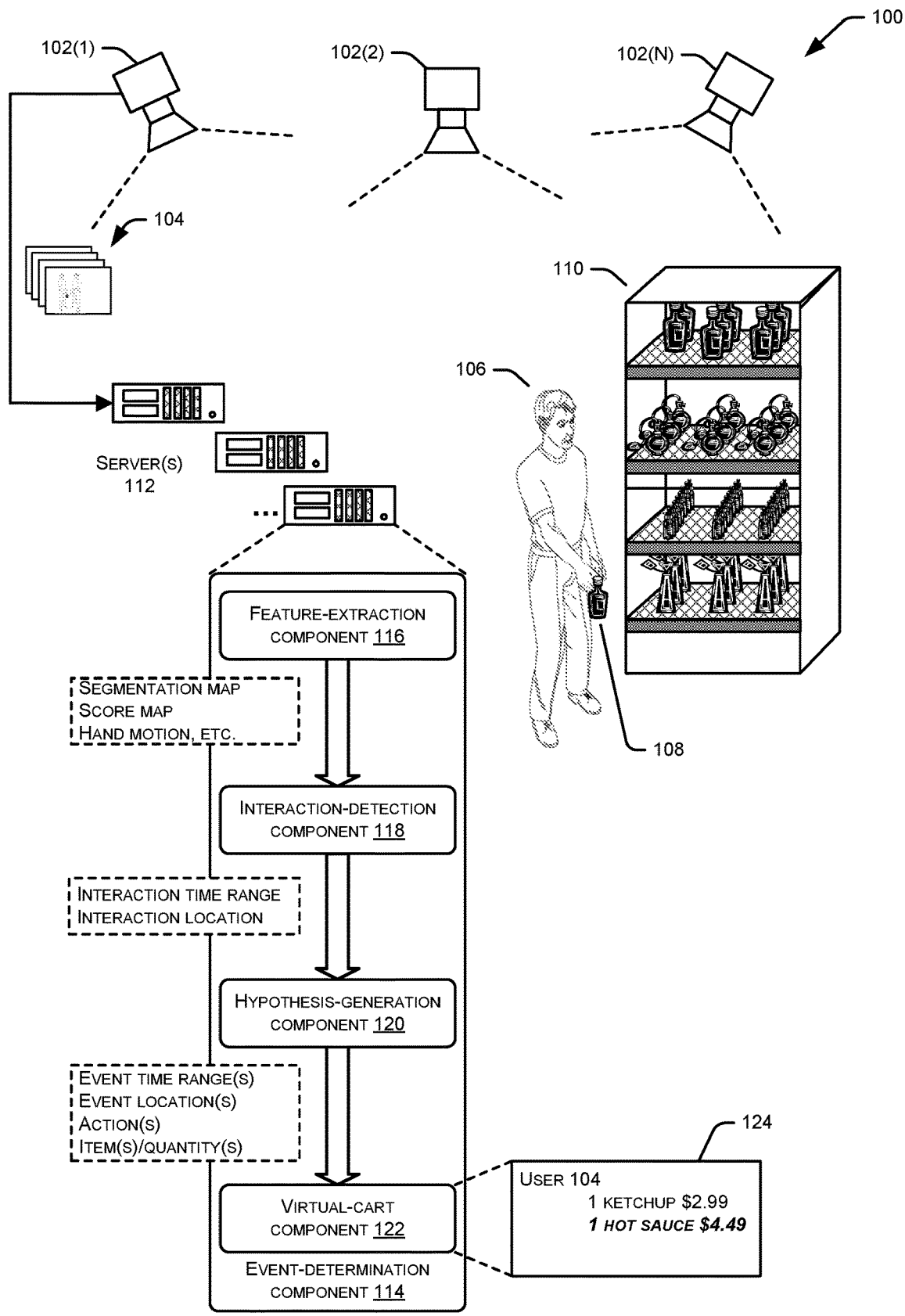
FIG. 1 illustrates an example scenario where an event-determination component is able to identify an event using image data. To do so, a camera sends the video data to the event-determination component, which extracts one or more features from the image data, identifies an interaction between a user and an item based on the feature data, identifiers an event (e.g., a pick of an item) based on the interaction data, and updates a virtual cart of a user based on the identified event. In this example, the event-determination component determines that a particular user has picked a particular item from a shelf and, thus, updates a state of a virtual cart of the user to indicate the addition of the item.

This disclosure describes systems and techniques for identifying events that occur within an environment using image data captured at the environment. For example, one or more cameras may reside within an environment that includes user and items with which the users may interact. For example, the environment may comprise a retail location where users pick respective items from inventory locations and/or return these items to respective inventory locations. The image data generated by the cameras may be used to identify these events (e.g., the pick or return of an item), as well as generate event data indicative of these events. The event data may be used to update state of respective virtual carts of the users. For example, if a particular user is determined to have picked a particular item from an inventory location in the environment, the virtual cart of the user may be updated to reflect the addition of the item.

To identify these events, the one or more cameras may provide the generated image data to one or more server computing devices executing an instance of an event-determination component. The event-determination component may receive the image data and generate feature data associated with the image data. In some instances, the event-determination component may utilize one or more classifiers (e.g., convolutional neural networks (CNNs), etc.) to generate the feature data. The feature data may comprise, for example, a segmentation map indicating the location of different objects within the image data. For example, the segmentation map may determine which pixels of the image data correspond to which labels. The respective labels may correspond to different portions of a user (e.g., a head of a user, a body of a user, an arm of a user, a hand of a user, etc.), an item, an inventory location, or the like.

In addition, the feature data may include a customer-interaction score map indicating, for respective locations of the map, the amount of interaction between a user and an item in the environment. For example, this score map may indicate, on a per-pixel or other location basis, a value corresponding the perceived level of interaction between a user represented in the image data and an item represented in the image data. In some instances, a relatively high value may be representative of a relatively high amount of interaction, while a relatively low value may be indicative of a relatively low amount of interaction. Thus, a location within the image data depicting a user reaching into an inventory location (e.g., a shelf) may have a relatively high interaction score compared to a location of the image data corresponding to the floor.

In addition, or in the alternative, the feature data may indicate a direction and/or velocity of a hand of a user depicted in the image data. For example, this feature data may indicate where within the image data the hand of the user is located as well as a direction that the hand is moving and a speed at which the hand is moving. In some instances, this information may be determined in part based on the segmentation map indicating the location of different objects, such as a hand of a user, in the image.

The feature data may additionally or alternatively include a state of the user's hand, potentially over several image frames. In some instances, this information may be generated, at least in part, on segmentation maps generated for the different frames, with these maps labeling certain objects, such as a hand of a user, an item, and/or the like.

In one example, the feature data may indicate that a hand of a user was empty while moving towards an inventory location and that the hand of the user held an item while moving away from the inventory location. This feature data may be indicative of a user picking an item from the inventory location. In another example, the feature data may indicate that a hand of the user held an item while moving towards the inventory location and was empty while moving away from the inventory location. This may be indicative of a return of the item. In yet another example, the feature data may indicate that the hand of the user was empty both while moving toward the inventory location and upon moving away from the inventory location. This data may be indicative of a non-event, that is indicative that the user neither picked nor returned an item. In still another example, the feature data may indicate that the hand of the user held an item while moving toward the item and held an item while moving away from the inventory location. This may indicate that no additional event occurred, that the user exchanged a first item for a second item, that the user grabbed an additional item, and/or the like.

In other instances, the feature data may indicate a location of an item in a hand of a user. For example, a generated segmentation map may be used to identify an item being held by a user. In still another example, the feature data may indicate other information such as a state of the inventory location near the user, the association between the identified head and one or more identified hands of the user, the association between a potential event being represented by the image data and the head of the user, and the like.

After the event-determination component generates the feature data, the event-determination component may analyze the feature data to determine whether it represents an interaction (e.g., a possible event, such as a user picking or returning an item). In some instances, the event-determination component performs this analysis using one or more additional classifiers (e.g., CNNs), while in other instances the event-determination component does so by using computer-vision algorithms that have been trained to identify interactions at certain locations within the image data, such as locations corresponding to shelfs or other inventory locations.

If the event-determination component identifies an interaction, this component may generate interaction data representative of the interaction. In some instances, this interaction data may indicate a time range and a location of the interaction. The time range may specify the time of the interaction using timestamps, an indication of image frames over which the interaction has been identified, or the like. The location information, meanwhile, may comprise one or more bounding boxes of the image data at locations corresponding to the interaction. For example, the interaction data may comprise a time range and a single bounding box corresponding inclusive of each location across the time range at which the interaction has been deemed to occur. In other instances, the interaction data may comprise a time range and, at each of the multiple image frames across this time range, a respective bounding box indicating a location of the interaction within that frame. In these instances, the location of each bounding box may change over time (e.g., across frames).

Upon identifying an interaction and, thus, generating the interaction data, the event-determination component may analyze the interaction data to determine whether the interaction data indicates existence of one or more events—that is, predefined activities of interest, such as a user picking an item, returning an item, exchanging an item, performing a predefined gesture, and/or the like. In some instances, the event-determination component may identify one or more events based on the interaction data, while in other instances it may not. To provide an example, envision that the event-determination component utilizes a trained classifier to identify a user picking or returning an item from an inventory location, and that one or more cameras within an environment generate image data of a user picking up an item and setting the item back down. While the event-determination component may identify an interaction based on feature data generated using the image data, this component might not identify an event, given that the user neither picked nor returned an item. If, however, the user picks the item and places it into her shopping cart, for example, the event-determination component may identify this event.

In instances where the event-determination component identifies an event, this component may generate event data indicative of the event. This event data may include a time range of the event (which may be the same as or different than the time range of the interaction), a location of the event (e.g., a particular inventory location), an action associated with the event (e.g., a pick of an item, a return of an item, a gesture, etc.), an identity of an item associated with the event, an identity of the user(s) associated with the event, and/or the like.

In some instances, this event data may be used to update state of a virtual cart of a user. For example, upon identifying a particular user picking an item from a shelf, the event-determination component may update a virtual cart of the user to indicate the addition of the item. Conversely, upon identifying the user placing a particular item back on the shelf that was previously in the virtual cart of the user, the event-determination component may update state of the virtual cart of the user to indicate this removal.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, or any other location. In some instances, the event-determination component may utilize event classifiers that are trained to identify, from the image data, certain predefined activity such as a user picking up an item, a user placing or setting down an item, a user inspecting a product, a first user passing an item to a second user, or the like. Of course, while the techniques are described below with reference to certain example events, it is to be appreciated that the techniques may be used to create and utilize events classifiers for identifying additional and/or different events or activities.

Further, it is noted that in some instances the event-determination component may be trained and/or configured to identify event using only the image data, rather than the data acquired by other sensors in the facility. In other instances, the event-determination component may also utilize sensor data from other sensors, such as microphones, weight sensors, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1, for instance, illustrates an example environment 100 where one or more cameras 102(1), (2), . . . , (N) (collectively "cameras 102") capture image data 104 (e.g., video data) of a user 106 in the environment. In this example, the user 106 is in the process of picking an item 108 from an inventory location 110 in the environment 100. As illustrated, the cameras 102 may generate and provide this image data 104 to one or more servers 112, which include an event-determination component 114 that is able to identify one or more events (e.g., predefined activities) using the image data 104.

As illustrated, the event-determination component 106 may include a feature-extraction component 116, an interaction-detection component 118, a hypothesis-generation component 120, and a virtual-cart component 120. Collectively, these components of the event-determination component may identify, using the image data 104, any events represented by the image data and, in some instance, update state of one or more virtual carts of users in the environment to reflect the identified events. For example, and as described in further detail below, a state of a virtual cart 124 associated with the user 106 may be updated based on the event-determination component 114 identifying the user 106 picking the item 108 from the inventory location 110.

To begin, the feature-extraction component 116 may receive the image data 104 generated by the cameras 102. For example, the image data 104 may initially be stored in one or more databases accessible to the feature-extraction component 116, which may retrieve some or all of the image data 104. In other instances, meanwhile, the feature-extraction component 116 may reside on one or more of the cameras 102 or at any other location. In the former instances, each camera may generate feature data corresponding to the image data it captures and may provide this feature data to the event-determination component 114 instead of, or in addition to, the image data 104. It is to be appreciated that performing the feature extraction on the cameras 102 and sending the feature data, rather than the image data, may improve processing of the system by avoiding the sending of larger amounts of data, in the form of image data 114, over one or more networks.

Figure 4:
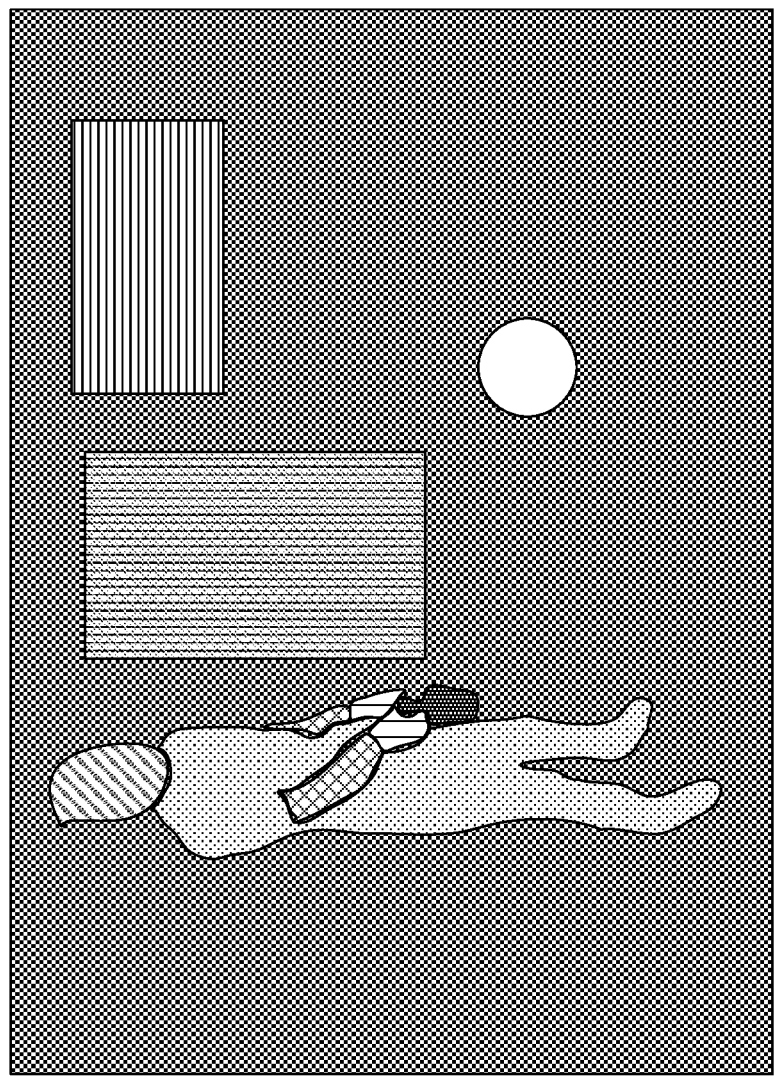
FIG. 4 illustrates an example frame of image data that been segmented using computer-vision algorithms and associated with example semantic labels. As illustrated, each pixel value of the frame of video data has been associated with a semantic label, such as background, head, body, arm, hand, or item.

Regardless of whether the feature-extraction component 116 resides on the cameras 102 or at the event-determination component 114, upon receiving the image data 104, the feature-extraction component 116 may generate feature data associated with the image data using, for example, one or more trained classifiers, such as artificial neural networks, support vector machines, decision trees, random forests, or the like. In some instances, generating the feature data may include generating a segmentation map that classifies pixels within the image data as corresponding to a particular object. For example, the feature-extraction component 116 may utilize one or more classifiers that have been trained to identify certain objects within the image data, such as a head of a user, a hand of a user, an arm of a user, a body of a user, an item, an item in a hand of a user, an inventory location, an item on an inventory location, a distance/relationship between a head and a hand, a distance/relationship between an event and a hand or head, a background, a floor, a ceiling, and/or the like. For example, the classifier(s) may assign one or more labels to each pixel of the image data 104 indicating what that pixel represents. For instance, the feature-extraction component 116 may assign some pixels a label of "head", other pixels a label of "hand", and the like. FIG. 4 illustrates an example segmentation map and is described below.

In addition, or in the alternative, the feature data may comprise a customer-interaction score map indicating a degree to which each location of the image data 104 appears to represent an interaction. For example, the customer-interaction score map may comprise, for each pixel or block of pixels in a frame of the image data 104, a value indicating a likelihood that that location represents an interaction between a user and an item. For example, if a frame of image data did not represent a user (e.g., because no user was in the purview of the corresponding camera), each pixel or block of pixels may have a value of zero, indicating that there is no interaction in the image data. Conversely, if a user were reaching into an inventory location at a top-left portion of the frame of image data 104, then the customer-interaction score map may have relatively high values at these locations but in a remainder of the frame.

In another example, the feature-extraction component 116 may generate feature data indicating a direction and/or velocity of any hands of a user within the image data 104. For example, the feature-extraction component 116 may utilize the segmentation maps generated across multiple frames of the image data 104 to identify the changing location of each depicted user hand and may use this information to note the vector associated with the hand of the user. In addition, the feature data may comprise a state of each user hand in the image data 104 over time. The state may indicate whether the hand is empty or contains an item. In some instances, the state indicates whether the hand was empty while moving towards the inventory location 110 and held an item while moving away from the inventory location 110, was empty both directions, was holding an item both directions, or held an item while moving towards the inventory location 110 and was empty moving away from the inventory location 110.

The feature-extraction component 116 may additionally, or alternatively, generate feature data indicating a state of the inventory location 110 represented by the image data. For example, the feature-extraction component 116 may determine a location of the camera that generated the image data 104 within the environment 110 to determine the inventory location 110 depicted by the image data 104. This location information may be used to query a database indicating a current state of the depicted inventory location 110, such as whether the location is tidy or untidy (e.g., includes one or more items that belong at another inventory location), the items associated with that location 110, and/or the like. In some instances, the feature data may indicate how the state of the inventory location 110 changes over a time range of the image data 104. While a few examples of the state of an inventory location 110 are described, it is to be appreciated that the state of the inventory location 110 may indicate any other information regarding the items located at the inventory location 110, users proximate the inventory location 110, or the like.

While a few example features have been described, it is to be appreciated that the feature-extraction component 116 may generate any other number of type of features associated with the illustrated user 106, item 108, inventory location 110, or the like.

After generating the feature data associated with the image data 104, the feature-extraction component 116 may provide this feature data to the interaction-detection component 118. The interaction-detection component 118 may be configured to identify an interaction between a user, such as the user 106, and one or more items in the environment 100, such as the item 108. As used herein, an interaction may, but need not, be indicative of an event, which may comprise a predefined activity of interest. That is, while some identified interactions may in fact indicate an event (e.g., activity of interest), some identified interactions will not. To provide an example, an interaction may be identified when a user rummages a shelf, but does not ultimately pick or return an item. However, in this circumstance an event might not be identified, given that the user ultimately did not pick or return an item. In the illustrated example of FIG. 1, however, an interaction of the user 106 reaching into the inventory location 110 and picking the item 108 may result in identification of an event, namely the picking of the item 108.

In some instances, the interaction-detection component 118 utilizes one or more trained classifiers to identify an interaction from the feature data. These classifiers may comprise CNNs, SVMs, decision trees, or the like. In some instances, these trained classifier(s) output interaction data indicating a time range and location associated with the interaction. For example, the interaction data may comprise an indication of a beginning time of the interaction, an end time of the interaction, and a location of the interaction over this time range. The start and end times may be specified in any manner, such as by corresponding timestamps, frame identifiers, or the like. The location, meanwhile, may comprise one or more bounding boxes within the frames of the image data 104 over the time range of the interaction. For example, the interaction data may indicate, for each frame within the interaction time range, a corresponding bounding box indicating a region of interest. For example, this location data may comprise an indication of one or more inventory locations of interest, such as particular shelves, lanes, or the like. This interaction data may then be further analyzed to determine whether it represents an event, as described below.

The hypothesis-generation component 120 may receive the interaction data from the interaction-detection component 118 and may analyze the interaction data to determine whether it represents one or more events (e.g., activities of interest). In some instances, the hypothesis-generation component 120 may also utilize one or more trained classifiers, such as CNNs, SVMs, or the like, to determine whether the interaction data represents one or more events. In addition, in some instances the hypothesis-generation component 120 may receive additional data from one or more other data sources, such as the location of users within the environment from a location service, an indication of shelf-states from a tidy service, or the like.

In some instances, if the hypothesis-generation component 120 does not identify an event, then it disregards the interaction data and refrains from generating event data. If, however, the hypothesis-generation component 120 identifies an event, then the hypothesis-generation component 120 may generate event data indicative of the event. The event data may comprise an event time range, an event location, an identity of any items involved, actions associated with the event, an identity of any users associated with the event, and/or the like. For example, the event data may indicate a start time of the event, an end time of the event, a location of the event (e.g., a shelf indication), an action of the event (e.g., pick, return, etc.), and an identity and quantity of the item. The hypothesis-generation component 120 may thereafter provide this event data to the virtual-cart component 122.

Furthermore, in some instances, the hypothesis-generation component 120 may include multiple classifiers. For example, the hypothesis-generation component 120 may include a first classifier that has been trained to determine, from the interaction data, whether the interaction data represents one or more events. If so, the interaction data may be passed to a second classifier to localize the one or more events therein. For example, the first classifier may be trained to output an indication of whether the interaction data represents a pick (or take) of an item, a return of an item, multiple events, or no action. The second classifier may then determine the location (e.g., lane, shelf, etc.) of the event, or the location of each of multiple events if the interaction data represents multiple events.

The virtual-cart component 122 may receive the event data from the hypothesis-generation component 120 and may update state of one or more virtual carts of the user(s) associated with the event(s). In some instances, the event data may identify the user(s), and the virtual carts may be identified using this information. In other instances, the virtual-cart component 122 may receive additional data, such as the locations of user in the environment 100, for identifying the user(s) and, thus, the virtual cart(s). In either instance, the virtual-cart component 122 may update the state of the corresponding virtual cart(s) to indicate the event. For instance, in the illustrated example of FIG. 1, the virtual-cart component 122 may update the virtual cart 124 associated with the user 106 to indicate the pick of the item 108. As illustrated, in this example the virtual cart has been updated to indicate that the user 106 picked the item 108 (in this case ajar of hot sauce costing $4.49).

Figure 2A:
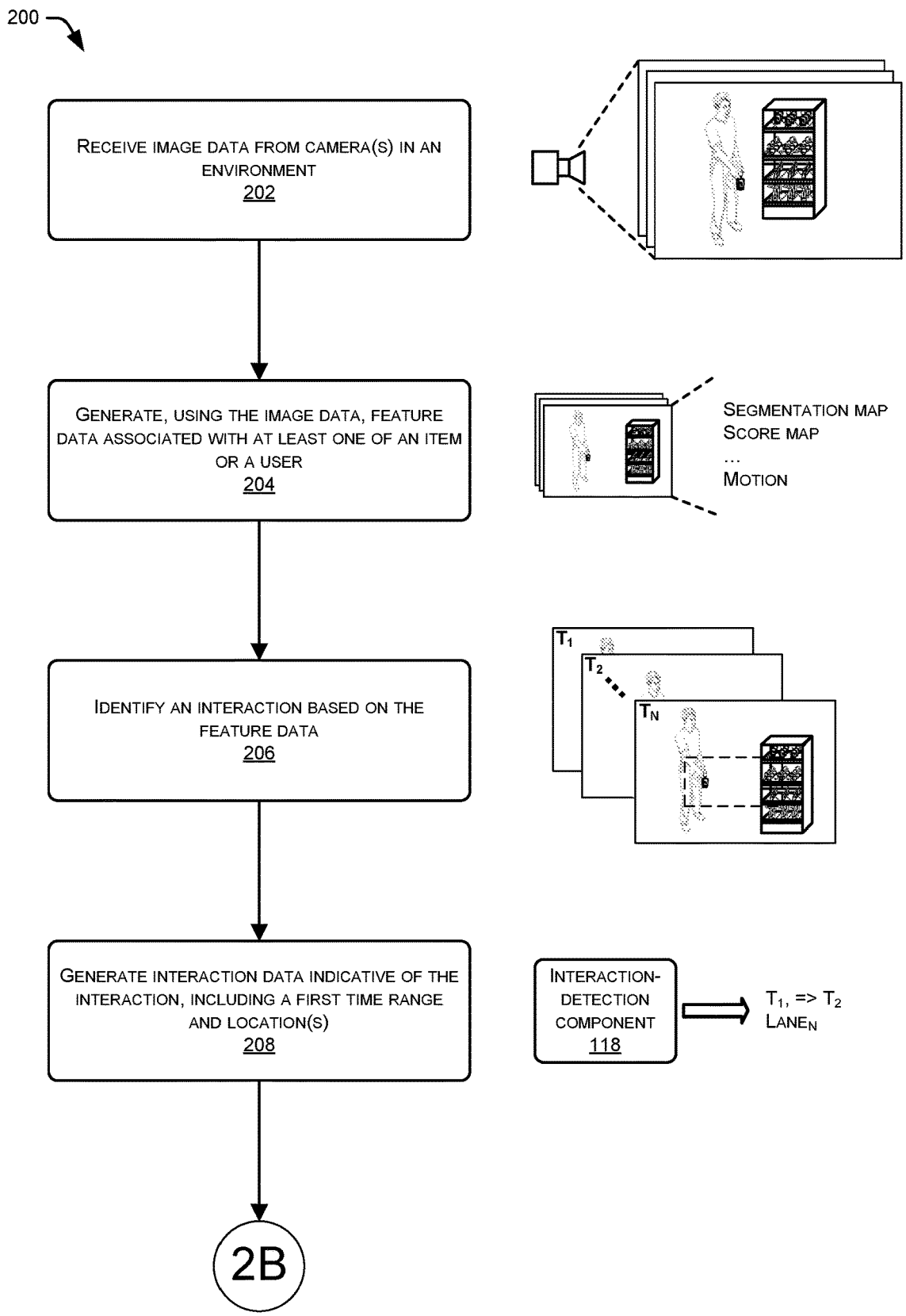
FIGS. 2A-B collectively illustrate a flow diagram of an example process for receiving image data from one or more cameras in an environment, generating feature data based on the image data, generating interaction data indicative of a time range and location of a potential event based on the feature data, and generating event data indicative of an event based on the interaction data. The event data may indicate a time, location, item, and action taken with respect to the item and, in some instances, may be used to update a virtual cart of a user.
Figure 2B:
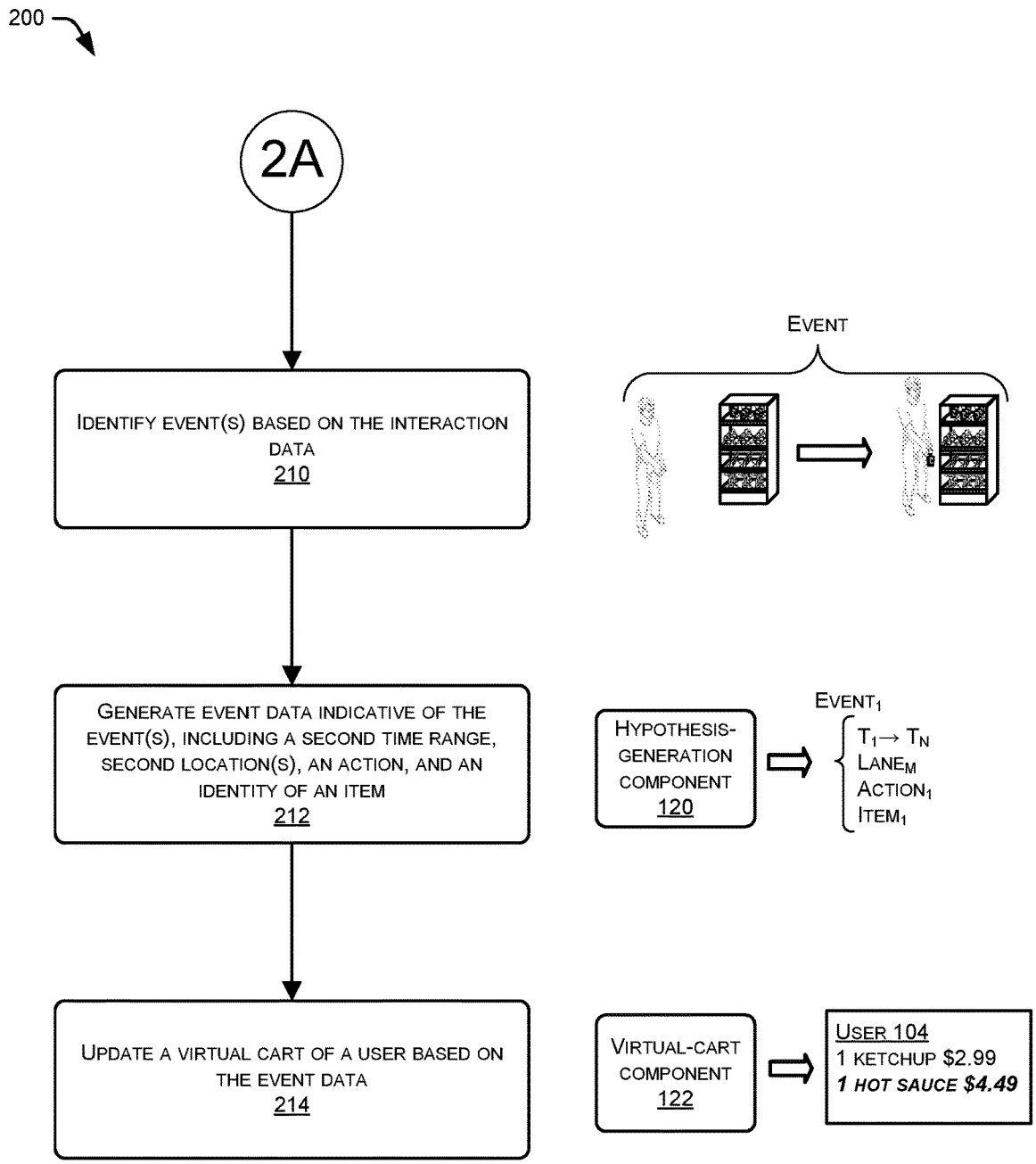

FIGS. 2A-B collectively illustrate a flow diagram of an example process 200 for receiving image data from one or more cameras in an environment, generating feature data based on the image data, generating interaction data indicative of a time range and location of a potential event based on the feature data, and generating event data indicative of an event based on the interaction data. The event data may indicate a time, location, item, and action taken with respect to the item and, in some instances, may be used to update a virtual cart of a user. The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

An operation 202 represents receiving image data from one or more cameras in an environment, such as the environment 100. For example, the event-determination component 114 may receive the image data as described above.

At an operation 204, the event-determination component 114 may generate, using the image data, feature data associated with at least one of a user or an item represented in the image data. In some instances, the event-determination component 114 may utilize one or more trained classifiers to generate this feature data, which may include labeled pixel data (e.g., a segmentation map), a customer-interaction score map, or the like. Further, as discussed above, generating the feature data may occur on the camera(s), at one or more servers in the environment or remote from the environment, or in any other location.

Regardless of where the feature data is generated, the feature data may be generated from the image data using one or more trained classifiers, such as artificial neural networks, support vector machines, decision trees, random forests, or the like. This feature may comprise a segmentation map that classifies pixels within the image data as corresponding to a particular object. For example, one or more classifiers that have been trained to identify certain objects within the image data may be used to identify an array of different objects, such as a head of a user, a hand of a user, an arm of a user, a body of a user, an item, an item in a hand of a user, an inventory location, an item on an inventory location, a distance/relationship between a head and a hand, a distance/relationship between an event and a hand or head, a background, a floor, a ceiling, and/or the like. These classifiers may assign one or more labels to each pixel of the image data indicating what that pixel represents. For instance, some pixels may be assigned a label of "head", other pixels a label of "hand", and the like.

Furthermore, the feature data may indicate the location of these different objects, potentially with reference to the location of objects relative to other objects in the segmentation map. For example, the feature data may indicate the location of a head in the image data (the "head location"), the location of a hand in the image data (the "hand location"), the location of an arm in the image data (the "arm location"), and the like. Further, the feature data may represent the location of a user's head relative to the location of a user's arm and/or hand, potentially along with the location of the user's head, arm, and/or hand relative to a location of an inventory location in the facility. This feature data may be indicative of whether the user is reaching into or out of an inventory location (e.g., a shelf). In addition, the feature data may indicate the relationship between a particular object (e.g., a hand, head, arm, etc.) and a detected event. For instance, the feature data may indicate a location of a head of the user (or other object associated with the user) to a location of an event. This feature data may be indicative of whether the user associated with the object is associated with the occurring event.

In addition, the feature data may comprise a customer-interaction score map indicating a degree to which each location of the image data appears to represent an interaction between a user and an item and/or an inventory location. For example, the customer-interaction score map may comprise, for each pixel or block of pixels in a frame of the image data, a value indicating a likelihood that that location represents an interaction between a user and an item. For example, if a frame of image data did not represent a user (e.g., because no user was in the purview of the corresponding camera), each pixel or block of pixels may have a value of zero, indicating that there is no interaction in the image data. Conversely, if a user were reaching into an inventory location at a top-left portion of the frame of image data, then the customer-interaction score map may have relatively high values at these locations but in a remainder of the frame.

In another example, the feature data may indicate a direction and/or velocity of any hands of a user within the image data. For example, the feature data may identify the changing location of each depicted user hand and may use this information to note the vector associated with the hand of the user. In addition, the feature data may comprise a state of each user hand in the image data over time. The state may indicate whether the hand is empty or contains an item. In some instances, the state indicates whether the hand was empty while moving towards the inventory location and held an item while moving away from the inventory location, was empty both directions, was holding an item both directions, or held an item while moving towards the inventory location and was empty moving away from the inventory location.

The feature data may also indicting a state of the inventory location represented by the image data. For example, the feature-extraction component 116 may determine a location of the camera that generated the image data within the environment to determine the inventory location depicted by the image data. This location information may be used to query a database indicating a current state of the depicted inventory location, such as whether the location is tidy or untidy (e.g., includes one or more items that belong at another inventory location), the items associated with that location, and/or the like. In some instances, the feature data may indicate how the state of the inventory location 110 over a time range of the image data.

While a few example features have been described, it is to be appreciated that the feature-extraction component 116 may generate any other number of type of features associated with the illustrated user 106, item 108, inventory location 110, or the like.

At an operation 206, the event-determination component 114 may identify an interaction based on the feature data and, at an operation 208, may generate interaction data indicative of this identified interaction. In some instances, the interaction data may indicate a first time range and a first location, such as a start time of the interaction, an end time of the interaction, and a location of the interaction within the image data over that first time range. The location may be specified as a location within the environment (e.g., a particular aisle, shelf within an aisle, lane within a shelf, etc.), a location within the image(s) (e.g., a bounding box(es) over the images associated with the time range), or the like. In some instances, the interaction data indicates several different inventory-location hypotheses, such as multiple different lanes, shelves, etc. at which an interaction may have occurred.

In some instances, an interaction may be determined using one or more of a geometry- or a learning-based approach. For instance, for inventory locations that are not yet associated with a trained classifier, the techniques may use a geometry-based approach for detecting an interaction at the inventory location. For inventory locations associated with trained classifiers, meanwhile, these classifiers may be used to identify the interactions.

The geometry-based approach may utilize the feature data indicating the location of a user's head, arm, hand, or the like, as well as the associations between these objects, together with information associated with the facility (e.g., the location of overhead cameras in the facility, the layout of the facility, a planogram indicating the location and identity of items at different inventory locations, etc.) to detect the interactions. Furthermore, after accumulating sufficient training data for a given inventory location using the geometry-based approach, a classifier may be trained for identifying subsequent interactions at the inventory location.

FIG. 2B continues the illustration of the process 200 and includes, at an operation 210, the event-determination component 114 identify one or more events from the interaction data. As described above, the event-determination component 114 may utilize one or more trained classifiers to identify these events. In some instances, individual classifiers may have been trained to identify respective events—that is, activities of interest. In some instances, the identified events may include the picking of items, the returning of items, or the like.

At an operation 212, the event-determination component 114 may generate event data indicative of each of the identified events. In some instances, the event data comprises a second time, representing a start time of the corresponding event and an end time of the corresponding event. For example, the start time of the event may represent, in the example of FIG. 1, the time that the user 106 reaches into the inventory location and the end time may comprise the time after which the user 106 places the item 108 in his cart. The event data may also comprise an identifier of the items, an indication of the actions taken (e.g., pick, return, etc.), an identity of the user(s), and/or the like. At an operation 214, the event-determination component 114 may update state of one or more virtual carts based at least in part on the event data, as described above.

Figure 3:
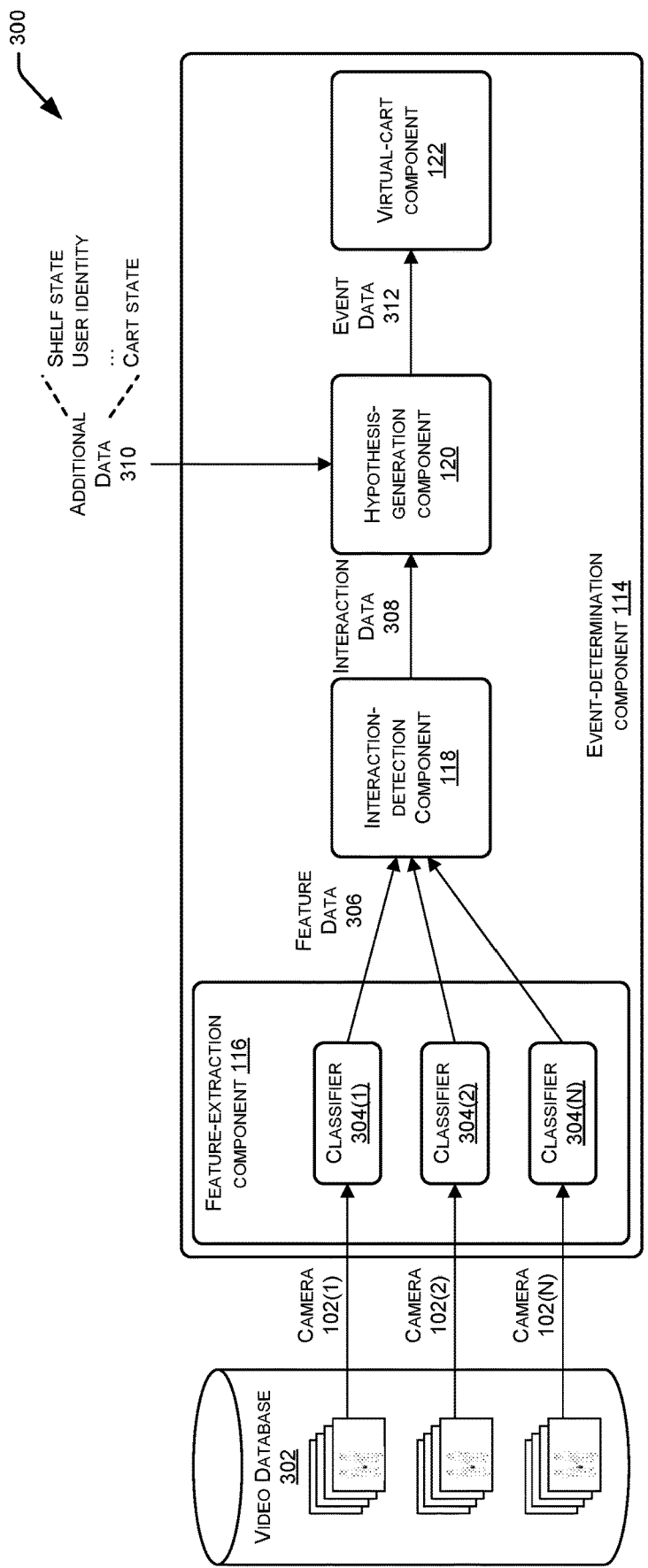
FIG. 3 illustrates an example flow of data within components of the event-determination component discussed above with reference to FIG. 1.

FIG. 3 illustrates an example architecture 300 and flow of data into and within components of the event-determination component 114 discussed above with reference to FIG. 1. As illustrated, the architecture includes a video database 302 configured to receive and store image data captured by the one or more cameras 102. In some instances, as illustrated, the feature-extraction component 114 resides on the event-determination component 114 and receives the respective image data from the video database 302. In other instances, described above, the feature-extraction component 116 may reside on one or more of the cameras and may perform the feature extraction on the cameras 102 themselves.

In either instance, the feature-extraction component 116 may include one or more classifiers 304(1), 304(2), . . . , 304(N) for generating feature data 306 using the image data. As illustrated, in some examples, the feature-extraction component 116 includes an individual classifier for generating feature data 306 for an individual camera. The feature data 306, meanwhile, may comprise any of the information described above, such as a segmentation map, a customer-interaction score, a location of a head, arm, item, or the like, or any other type of feature data. The interaction-detection component 118 may receive the feature data 306 from the one or more classifiers 304(1)-(N) and may use this data to generate interaction data 308. Again, the interaction data 308 may indicate a time range and location of an interaction in the environment between an user and an item, a first user and a second user, or any other type of interaction.

The interaction data 308 may be provided to the hypothesis-generation component 120 for determining whether the interaction data 308 represents one or more events. In some instances, the hypothesis-generation component 120 makes this determination using the interaction data 308 and additional data 310, such as a current state of a shelf, aisle, or lane corresponding to the interaction data, identit(ies) of any user(s) at or near the location corresponding to the interaction data, a state of a virtual cart of any proximate users, and/or the like. Further, and as described above, the hypothesis-generation component 120 may utilize multiple classifiers in some instances, such as a first classifier for determining whether the interaction data 308 represents one or more events and, if so, a second classifier to parse out the different events and localize the different events. As illustrated, after determining that the interaction data 308 indicates the existence of one or more events, the hypothesis-generation component 120 may generate and output event data 312 indicative of the event(s). The event data 312 may comprise a time range of a particular event, a location of the event, an action associated with the event, an item associated with the event, a quantity of the item associated with the event, an identity of a user associated with the event, and so forth. The virtual-cart component 122 may receive the event data 312 and may update the state of one or more virtual carts corresponding to the event data 312.

In some instances, the hypothesis-generation component 120 receives the interaction data 308, potentially along with the additional data 310, and outputs an indication of whether there has been no change at the inventory location (e.g., there is no event), whether the interaction data represents a single event, such as a pick or return, or whether the interaction data represents multiple events (e.g., multiple picks and/or returns). In instances where the hypothesis-generation component 120 determines that no change has occurred, no action may be performed. In instances where the hypothesis-generation component 120 determines that the interaction data represents a single event, the interaction data 308 and/or the additional data 308 may be fed into another classifier for localizing the event. That is, the data may be provided to the second classifier for determining the event data 312, such as the inventory location associated with the event, the type of event, the identity of the item(s) involved, and/or the like. Finally, in some instances, when the hypothesis-generation component 120 outputs an indication that the interaction data 308 represents multiple events, this data (e.g., image data) may be provided to one or more computing devices for analysis by one or more human users.

FIG. 4 illustrates an example segmentation map 402 of a particular frame of image data. As illustrated, the segmentation map 402 indicates that different areas of the frame of image data have been associated with example semantic labels (e.g., "labels") using, for example, the classifiers 304(1)-(N) of the feature-extraction component 116, discussed above. In this example, the semantic labels include background 404, head 406, body 408, arm 410, hand 412, and item (or item in hand) 414, a ball 416, a door 418, and a display 420. Of course, it is to be appreciated that these are merely examples and that any other type of semantic label may be used. It is also noted that a classifier used to generate this example segmentation map 402 may be trained by employing human users to use computer-graphics tools to assign the respective semantic labels 404-414 to the different regions of the frame 402. After one or more of the human users assign these semantic labels to a threshold amount of image data, the classifier may be trained to apply the semantic labels to still additional image data.

Figure 5:
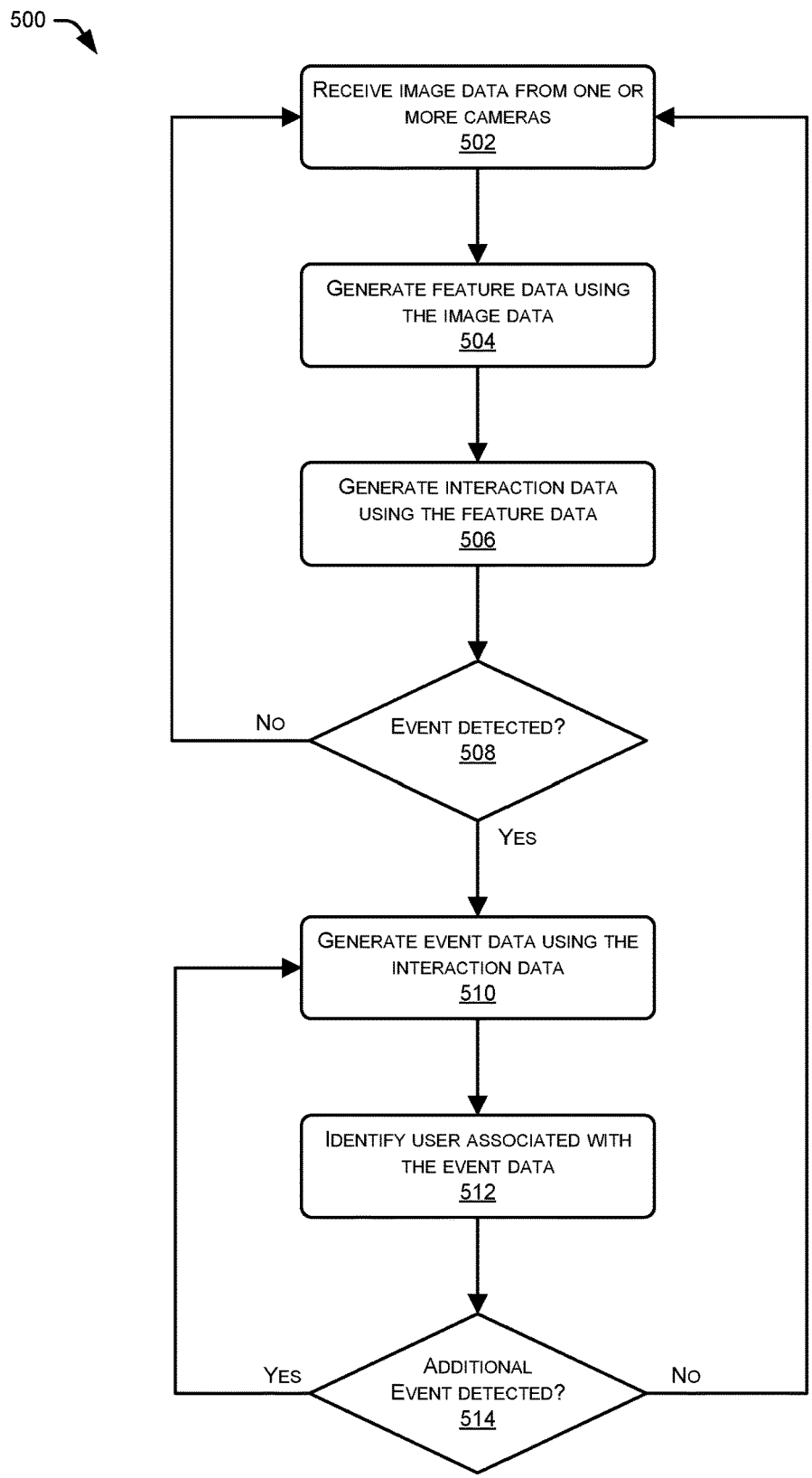
FIG. 5 illustrates a flow diagram of an example process for generating event data indicative of one or more events that occurred within an environment using image data captured at the environment.

FIG. 5 illustrates a flow diagram of an example process 500 for generating event data indicative of one or more events that occurred within an environment using image data captured at the environment. In some instances, the event-determination component 114 described above may execute some or all of the process 500.

The process 500 includes, at an operation 502, receiving image data from one or more cameras within an environment and, at an operation 504, generating feature data using the image data. The feature data may include a segmentation map, a customer-interaction score map, and/or the like. Further, as discussed above, generating the feature data may occur on the camera(s), at one or more servers in the environment or remote from the environment, or in any other location.

At an operation 506, the event-determination component 114 may generate interaction data if in fact the event-determination component 114 determines that the feature data is indicative of an interaction. As described above, the interaction data may include an indication of a time range of the interaction and an indication of a location of the interaction over the interaction time range.

At an operation 508, the event-determination component 114 may determine whether the interaction data represents an event. For example, the event-determination component 114 may utilize one or more event classifiers, each configured to determine whether the interaction data indicates existence of the corresponding event. If not, then the process 500 returns the operation 502 for continuing to analyze received image data.

If, however, the event-determination component 114 detects an event, then at an operation 510 the event-determination component 114 may generate event data indicative of the event. As described above, the event data may represent an event time range, a location of the event (e.g., a shelf identifier, lane identifier, etc.), an indication of the action taken, and an indication of the identity of the item acted upon. At an operation 514, the user(s) associated with the event may be identified. In some instances, the user(s) may be identified as part of generating the event data. In other instances, the user may be identified after creation of the event data and, for example, by accessing a location service and determining which user(s) was present at the location of the event at the time range associated with the event. In either instance, this information may be used, for example, to update state of a virtual cart of one or more users.

At an operation 514, the event-determination component 114 may determine whether the interaction data indicates the existence of one or more additional events. For example, the interaction data may indicate that a user picked two items (each pick being an individual event), that a first user picked (or returned) a first item and that a second user picked (or returned) a second item, and so forth. In these instances, the process 500 may return to the operation 510 for generating event data associated with the event, and so forth. If, however, at the operation 514 the event-determination component 114 determines that no additional event is represented by the interaction data, then the process 500 returns to the operation 502.

It is to be appreciated that while process 500, and other processes described herein, describe the analyzing of image data according to a serial process, that this analysis may occur in parallel for different windows of time. For example, the techniques may analyze image data for first amount of time (e.g., 30 seconds, 90 seconds, etc.) at periodic increments (e.g., 5 seconds, 20 seconds, etc.). As such, first image data corresponding a first 90-second sliding window may be analyzed, while five seconds later second image data corresponding to a second 90-second sliding window may be analyzed. Of course, while examples are described, it is to be appreciated that the sliding window may correspond to any other amount of time and may be moved in any other increment of time.

Figure 6:
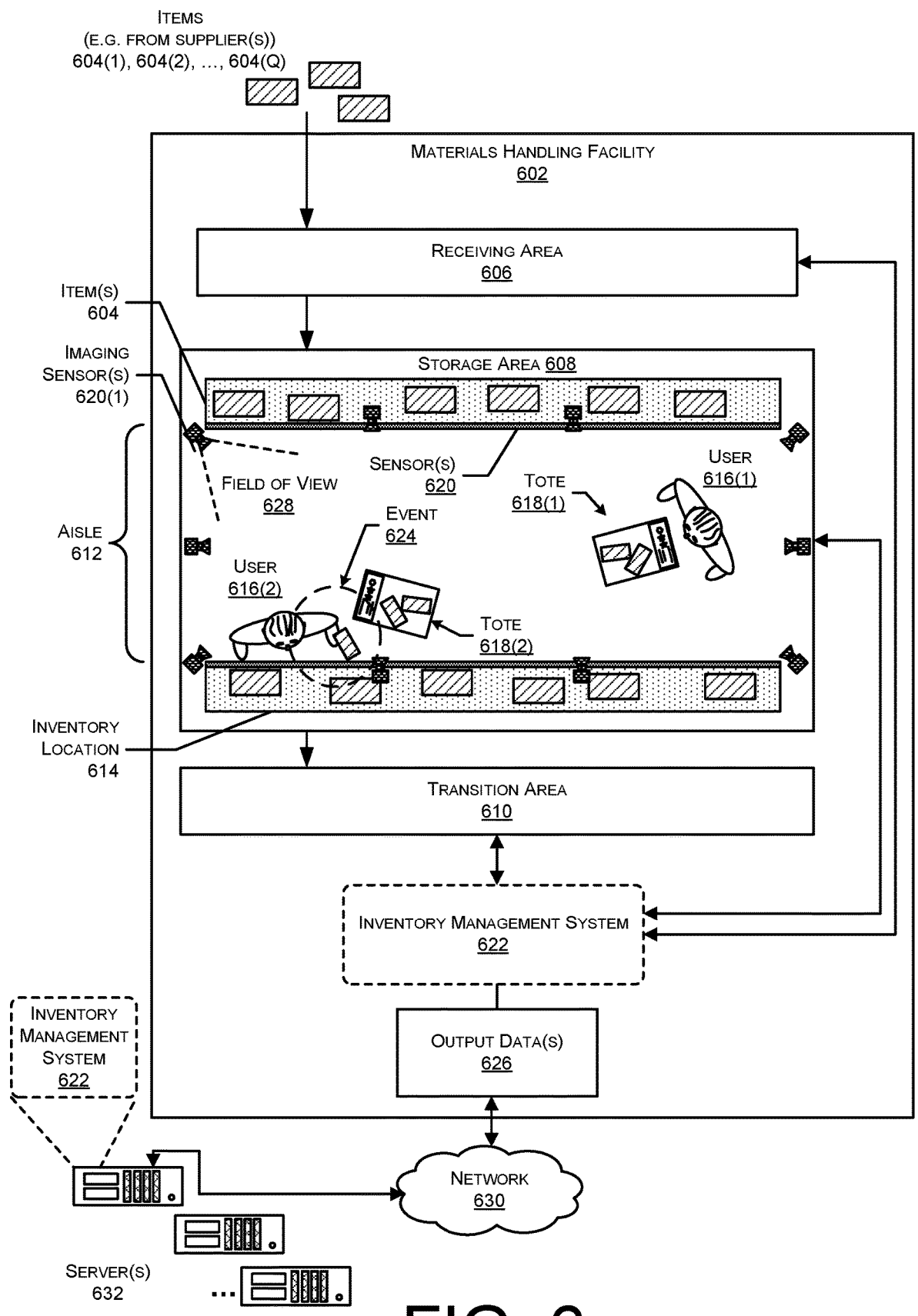
FIG. 6 is a block diagram of an example materials handling facility that includes sensors and an inventory management system configured to generate output regarding events occurring in the facility using the sensor data.
Figure 7:
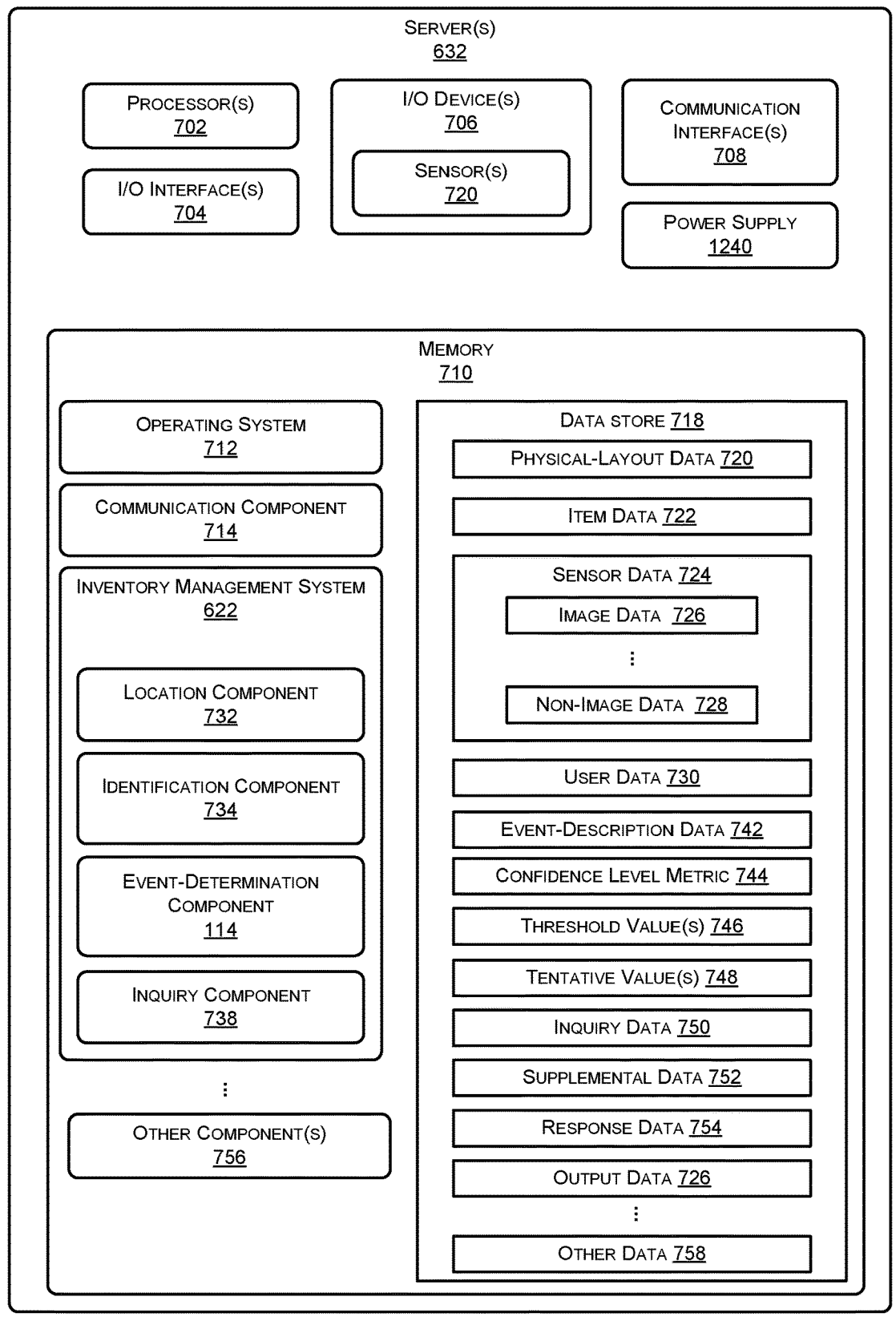
FIG. 7 illustrates a block diagram of one or more servers configured to support operation of the facility.

FIGS. 6 and 7 represent an illustrative materials handing environment, such as the materials handling facility 602, in which the techniques described herein may be applied to cameras monitoring the environments as described below. However, the following description is merely one illustrative example of an industry and environment in which the techniques described herein may be utilized. The materials handling facility 602 (or "facility") comprises one or more physical structures or areas within which one or more items 604(1), 604(2), . . . , 604(Q) (generally denoted as 604) may be held. As used in this disclosure, letters in parenthesis such as "(Q)" indicate an integer result. The items 604 comprise physical goods, such as books, pharmaceuticals, repair parts, electronic gear, groceries, and so forth.

The facility 602 may include one or more areas designated for different functions with regard to inventory handling. In this illustration, the facility 602 includes a receiving area 606, a storage area 608, and a transition area 610. The receiving area 606 may be configured to accept items 604, such as from suppliers, for intake into the facility 602. For example, the receiving area 606 may include a loading dock at which trucks or other freight conveyances unload the items 604.

The storage area 608 is configured to store the items 604. The storage area 608 may be arranged in various physical configurations. In one implementation, the storage area 608 may include one or more aisles 612. The aisle 612 may be configured with, or defined by, inventory locations 614 on one or both sides of the aisle 612. The inventory locations 614 may include one or more of shelves, racks, cases, cabinets, bins, floor locations, or other suitable storage mechanisms for holding or storing the items 604. The inventory locations 614 may be affixed to the floor or another portion of the facility's structure, or may be movable such that the arrangements of aisles 612 may be reconfigurable. In some implementations, the inventory locations 614 may be configured to move independently of an outside operator. For example, the inventory locations 614 may comprise a rack with a power source and a motor, operable by a computing device to allow the rack to move from one location within the facility 602 to another.

One or more users 616(1), 616(2), . . . , 616(U), totes 618(1), 618(2), . . . , 618(T) (generally denoted as 618) or other material handling apparatus may move within the facility 602. For example, the users 616 may move about within the facility 602 to pick or place the items 604 in various inventory locations 614, placing them on the totes 618 for ease of transport. An individual tote 618 is configured to carry or otherwise transport one or more items 604. For example, a tote 618 may include a basket, a cart, a bag, and so forth. In other implementations, other agencies such as robots, forklifts, cranes, aerial drones, and so forth, may move about the facility 602 picking, placing, or otherwise moving the items 604.

One or more sensors 620 may be configured to acquire information in the facility 602. The sensors 620 in the facility 602 may include sensors fixed in the environment (e.g., ceiling-mounted cameras) or otherwise, such as sensors in the possession of users (e.g., mobile phones, tablets, etc.). The sensors 620 may include, but are not limited to, cameras 620(1), weight sensors, radio frequency (RF) receivers, temperature sensors, humidity sensors, vibration sensors, and so forth. The sensors 620 may be stationary or mobile, relative to the facility 602. For example, the inventory locations 614 may contain cameras 620(1) configured to acquire images of pick or placement of items 604 on shelves, of the users 616(1) and 916(2) in the facility 602, and so forth. In another example, the floor of the facility 602 may include weight sensors configured to determine a weight of the users 616 or other object thereupon.

During operation of the facility 602, the sensors 620 may be configured to provide information suitable for tracking how objects move or other occurrences within the facility 602. For example, a series of images acquired by a camera 620(1) may indicate removal of an item 604 from a particular inventory location 614 by one of the users 616 and placement of the item 604 on or at least partially within one of the totes 618.

While the storage area 608 is depicted as having one or more aisles 612, inventory locations 614 storing the items 604, sensors 620, and so forth, it is understood that the receiving area 606, the transition area 610, or other areas of the facility 602 may be similarly equipped. Furthermore, the arrangement of the various areas within the facility 602 is depicted functionally rather than schematically. For example, multiple different receiving areas 606, storage areas 608, and transition areas 610 may be interspersed rather than segregated in the facility 602.

The facility 602 may include, or be coupled to, an inventory management system 622. As illustrated, the inventory management system 622 may reside at the facility 602 (e.g., as part of on-premises servers), on the servers 632 that are remote from the facility 602, a combination thereof. In each instance, the inventory management system 622 is configured to identify interactions and events with and between users 616, devices such as sensors 620, robots, material handling equipment, computing devices, and so forth, in one or more of the receiving area 606, the storage area 608, or the transition area 610. As described above, some interactions may further indicate the existence of one or more events 624—or predefined activities of interest. For example, events 624 may include the entry of the user 616 to the facility 602, stocking of items 604 at an inventory location 614, picking of an item 604 from an inventory location 614, returning of an item 604 to an inventory location 614, placement of an item 604 within a tote 618, movement of users 616 relative to one another, gestures by the users 616, and so forth. Other events 624 involving users 616 may include the user 616 providing authentication information in the facility 602, using a computing device at the facility 602 to authenticate identity to the inventory management system 622, and so forth. Some events 624 may involve one or more other objects within the facility 602. For example, the event 624 may comprise movement within the facility 602 of an inventory location 614, such as a counter mounted on wheels. Events 624 may involve one or more of the sensors 620. For example, a change in operation of a sensor 620, such as a sensor failure, change in alignment, and so forth, may be designated as an event 624. Continuing the example, movement of a camera 620(1) resulting in a change in the orientation of the field of view 628 (such as resulting from someone or something bumping the camera 620(1)) (e.g. camera 104) may be designated as an event 624.

By determining the occurrence of one or more of the events 624, the inventory management system 622 may generate output data 626. The output data 626 comprises information about the event 624. For example, where the event 624 comprises an item 604 being removed from an inventory location 614, the output data 626 may comprise an item identifier indicative of the particular item 604 that was removed from the inventory location 614 and a user identifier of a user that removed the item.

The inventory management system 622 may use one or more automated systems to generate the output data 626. For example, an artificial neural network, one or more classifiers, or other automated machine learning techniques may be used to process the sensor data from the one or more sensors 620 to generate output data 626. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 626 or the tentative results. The automated systems may generate confidence level data that provides information indicative of the accuracy or confidence that the output data 626 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 604, user 616, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 616 may pick an item 604(1) such as a perfume bottle that is generally cubical in shape from the inventory location 614. Other items 604 at nearby inventory locations 614 may be predominately spherical. Based on the difference in shape (cube vs. sphere) from the adjacent items, and the correspondence in shape with the previously stored image of the perfume bottle item 604(1) (cubical and cubical), the confidence level that the user 106 has picked up the perfume bottle item 604(1) is high.

In some situations, the automated techniques may be unable to generate output data 626 with a confidence level above a threshold result. For example, the automated techniques may be unable to distinguish which user 616 in a crowd of users 616 has picked up the item 604 from the inventory location 614. In other situations, it may be desirable to provide human confirmation of the event 624 or of the accuracy of the output data 626. For example, some items 604 may be deemed age restricted such that they are to be handled only by users 616 above a minimum age threshold.

In instances where human confirmation is desired, sensor data associated with an event 624 may be processed to generate inquiry data. The inquiry data may include a subset of the sensor data associated with the event 624. The inquiry data may also include one or more of one or more tentative results as determined by the automated techniques, or supplemental data. The subset of the sensor data may be determined using information about the one or more sensors 620. For example, camera data such as the location of the camera 620(1) within the facility 602, the orientation of the camera 620(1), and a field of view 628 of the camera 620(1) may be used to determine if a particular location within the facility 602 is within the field of view 628. The subset of the sensor data may include images that may show the inventory location 614 or that the item 604 was stowed. The subset of the sensor data may also omit images from other cameras 620(1) that did not have that inventory location 614 in the field of view 628. The field of view 628 may comprise a portion of the scene in the facility 602 that the sensor 620 is able to generate sensor data about.

Continuing the example, the subset of the sensor data may comprise a video clip acquired by one or more cameras 620(1) having a field of view 628 that includes the item 604. The tentative results may comprise the "best guess" as to which items 604 may have been involved in the event 624. For example, the tentative results may comprise results determined by the automated system that have a confidence level above a minimum threshold.

The facility 602 may be configured to receive different kinds of items 604 from various suppliers and to store them until a customer orders or retrieves one or more of the items 604. A general flow of items 604 through the facility 602 is indicated by the arrows of FIG. 2. Specifically, as illustrated in this example, items 604 may be received from one or more suppliers, such as manufacturers, distributors, wholesalers, and so forth, at the receiving area 606. In various implementations, the items 604 may include merchandise, commodities, perishables, or any suitable type of item 604, depending on the nature of the enterprise that operates the facility 602. The receiving of the items 604 may comprise one or more events 624 for which the inventory management system 622 may generate output data 626.

Upon being received from a supplier at receiving area 606, the items 604 may be prepared for storage. For example, items 604 may be unpacked or otherwise rearranged. The inventory management system 622 may include one or more software applications executing on a computer system to provide inventory management functions based on the events 624 associated with the unpacking or rearrangement. These inventory management functions may include maintaining information indicative of the type, quantity, condition, cost, location, weight, or any other suitable parameters with respect to the items 604. The items 604 may be stocked, managed, or dispensed in terms of countable, individual units or multiples, such as packages, cartons, crates, pallets, or other suitable aggregations. Alternatively, some items 604, such as bulk products, commodities, and so forth, may be stored in continuous or arbitrarily divisible amounts that may not be inherently organized into countable units. Such items 604 may be managed in terms of measurable quantity such as units of length, area, volume, weight, time, duration, or other dimensional properties characterized by units of measurement. Generally speaking, a quantity of an item 604 may refer to either a countable number of individual or aggregate units of an item 604 or a measurable amount of an item 604, as appropriate.

After arriving through the receiving area 606, items 604 may be stored within the storage area 608. In some implementations, like items 604 may be stored or displayed together in the inventory locations 614 such as in bins, on shelves, hanging from pegboards, and so forth. In this implementation, all items 604 of a given kind are stored in one inventory location 614. In other implementations, like items 604 may be stored in different inventory locations 614. For example, to optimize retrieval of certain items 604 having frequent turnover within a large physical facility 602, those items 604 may be stored in several different inventory locations 614 to reduce congestion that might occur at a single inventory location 614. Storage of the items 604 and their respective inventory locations 614 may comprise one or more events 624.

When a customer order specifying one or more items 604 is received, or as a user 616 progresses through the facility 602, the corresponding items 604 may be selected or "picked" from the inventory locations 614 containing those items 604. In various implementations, item picking may range from manual to completely automated picking. For example, in one implementation, a user 616 may have a list of items 604 they desire and may progress through the facility 602 picking items 604 from inventory locations 614 within the storage area 608, and placing those items 604 into a tote 618. In other implementations, employees of the facility 602 may pick items 604 using written or electronic pick lists derived from customer orders. These picked items 604 may be placed into the tote 618 as the employee progresses through the facility 602. Picking may comprise one or more events 624, such as the user 616 in moving to the inventory location 614, retrieval of the item 604 from the inventory location 614, and so forth.

After items 604 have been picked, they may be processed at a transition area 610. The transition area 610 may be any designated area within the facility 602 where items 604 are transitioned from one location to another or from one entity to another. For example, the transition area 610 may be a packing station within the facility 602. When the item 604 arrives at the transition area 610, the items 604 may be transitioned from the storage area 608 to the packing station. The transitioning may comprise one or more events 624. Information about the transition may be maintained by the inventory management system 622 using the output data 626 associated with those events 624.

In another example, if the items 604 are departing the facility 602 a list of the items 604 may be obtained and used by the inventory management system 622 to transition responsibility for, or custody of, the items 604 from the facility 602 to another entity. For example, a carrier may accept the items 604 for transport with that carrier accepting responsibility for the items 604 indicated in the list. In another example, a customer may purchase or rent the items 604 and remove the items 604 from the facility 602. The purchase or rental may comprise one or more events 624.

The inventory management system 622 may access or generate sensor data about the facility 602 and the contents therein including the items 604, the users 616, the totes 618, and so forth. The sensor data may be acquired by one or more of the sensors 620, data provided by other systems, and so forth. For example, the sensors 620 may include cameras 620(1) configured to acquire image data of scenes in the facility 602. The image data may comprise still images, video, or a combination thereof. The image data may be processed by the inventory management system 622 to determine a location of the user 616, the tote 618, the identity of the user 616, and so forth. As used herein, the identity of the user may represent a unique identifier of the user (e.g., name, number associated with user, username, etc.), an identifier that distinguishes the user amongst other users being located with the environment, or the like.

The inventory management system 622, or systems coupled thereto, may be configured to identify the user 616, as well as to determine other candidate users. In one implementation, this determination may comprise comparing sensor data with previously stored identity data. For example, the user 616 may be identified by showing their face to a facial recognition system, by presenting a token carrying authentication credentials, providing a fingerprint, scanning a barcode or other type of unique identifier upon entering the facility, and so forth. Identity of the user 616 may be determined before, during, or after entry to the facility 602. Determination of the user's 616 identity may comprise comparing sensor data associated with the user 616 in the facility 602 to previously stored user data.

In some instances, the inventory management system group users within the facility into respective sessions. That is, the inventory management system 622 may utilize the sensor data to determine groups of users that are effectively "together" (e.g., shopping together). In some instances, a particular session may include multiple users that entered the facility 602 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 618. Noting the child and the mother as belonging to the same session may increase the chances of successfully adding the box of cereal to the virtual shopping cart of the mother.

By determining the occurrence of one or more events 624 and the output data 626 associated therewith, the inventory management system 622 is able to provide one or more services to the users 616 of the facility 602. By utilizing one or more human associates to process inquiry data and generate response data that may then be used to produce output data 626, overall accuracy of the system may be enhanced. The enhanced accuracy may improve the user experience of the one or more users 616 of the facility 602. In some examples, the output data 626 may be transmitted over a network 630 to one or more servers 632.

FIG. 7 illustrates a block diagram of the one or more servers 632. The servers 632 may be physically present at the facility 602, may be accessible by the network 630, or a combination of both. The servers 632 do not require end-user knowledge of the physical location and configuration of the system that delivers the services. Common expressions associated with the servers 632 may include "on-demand computing," "software as a service (SaaS)," "cloud services," "data centers," and so forth. Services provided by the servers 632 may be distributed across one or more physical or virtual devices.

The servers 632 may include one or more hardware processors 702 (processors) configured to execute one or more stored instructions. The processors 702 may comprise one or more cores. The servers 632 may include one or more input/output (I/O) interface(s) 704 to allow the processor 702 or other portions of the servers 632 to communicate with other devices. The I/O interfaces 704 may comprise Inter-Integrated Circuit (I2C), Serial Peripheral Interface bus (SPI), Universal Serial Bus (USB) as promulgated by the USB Implementers Forum, and so forth.

The servers 632 may also include one or more communication interfaces 706. The communication interfaces 706 are configured to provide communications between the servers 632 and other devices, such as the sensors 620, the interface devices, routers, and so forth. The communication interfaces 706 may include devices configured to couple to personal area networks (PANs), wired and wireless local area networks (LANs), wired and wireless wide area networks (WANs), and so forth. For example, the communication interfaces 706 may include devices compatible with Ethernet, Wi-Fi™, and so forth. The servers 632 may also include one or more busses or other internal communications hardware or software that allow for the transfer of data between the various modules and components of the servers 632.

The servers 632 may also include a power supply 740. The power supply 740 is configured to provide electrical power suitable for operating the components in the servers 632.

The servers 632 may further include one or more memories 710. The memory 710 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 710 provides storage of computer-readable instructions, data structures, program modules, and other data for the operation of the servers 632. A few example functional modules are shown stored in the memory 710, although the same functionality may alternatively be implemented in hardware, firmware, or as a system on a chip (SOC).

The memory 710 may include at least one operating system (OS) component 712. The OS component 712 is configured to manage hardware resource devices such as the I/O interfaces 704, the communication interfaces 708, and provide various services to applications or components executing on the processors 702. The OS component 712 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 710. These components may be executed as foreground applications, background tasks, daemons, and so forth. A communication component 714 may be configured to establish communications with one or more of the sensors 620, one or more of the devices used by associates, other servers 632, or other devices. The communications may be authenticated, encrypted, and so forth.

The memory 710 may store an inventory management system 716. The inventory management system 716 is configured to provide the inventory functions as described herein with regard to the inventory management system 622. For example, the inventory management system 716 may track movement of items 604 in the facility 602, generate user interface data, and so forth.

The inventory management system 716 may access information stored in one or more data stores 718 in the memory 710. The data store 718 may use a flat file, database, linked list, tree, executable code, script, or other data structure to store the information. In some implementations, the data store 718 or a portion of the data store 718 may be distributed across one or more other devices including other servers 632, network attached storage devices, and so forth.

The data store 718 may include physical layout data 720. The physical layout data 720 provides a mapping of physical locations within the physical layout of devices and objects such as the sensors 620, inventory locations 614, and so forth. The physical layout data 720 may indicate the coordinates within the facility 602 of an inventory location 614, sensors 620 within view of that inventory location 614, and so forth. For example, the physical layout data 720 may include camera data comprising one or more of a location within the facility 602 of a camera 620(1), orientation of the camera 620(1), the operational status, and so forth. Continuing example, the physical layout data 720 may indicate the coordinates of the camera 620(1), pan and tilt information indicative of a direction that the field of view 628 is oriented along, whether the camera 620(1) is operating or malfunctioning, and so forth.

In some implementations, the inventory management system 716 may access the physical layout data 720 to determine if a location associated with the event 624 is within the field of view 628 of one or more sensors 620. Continuing the example above, given the location within the facility 602 of the event 624 and the camera data, the inventory management system 716 may determine the cameras 620(1) that may have generated images of the event 624.

The item data 722 comprises information associated with the items 604. The information may include information indicative of one or more inventory locations 614 at which one or more of the items 604 are stored. The item data 722 may also include order data, SKU or other product identifier, price, quantity on hand, weight, expiration date, images of the ITEM 604, detail description information, ratings, ranking, and so forth. The inventory management system 716 may store information associated with inventory management functions in the item data 722.

The data store 718 may also include sensor data 724. The sensor data 724 comprises information acquired from, or based on, the one or more sensors 620. For example, the sensor data 724 may comprise 3D information about an object in the facility 602. As described above, the sensors 620 may include a camera 620(1), which is configured to acquire one or more images. These images may be stored as the image data 726. The image data 726 may comprise information descriptive of a plurality of picture elements or pixels. Non-image data 728 may comprise information from other sensors 620, such as input from the microphones 920, weight sensors 620, and so forth.

User data 730 may also be stored in the data store 718. The user data 730 may include identity data, information indicative of a profile, purchase history, location data, images of the user 616, demographic data, and so forth. Individual users 616 or groups of users 616 may selectively provide user data 730 for use by the inventory management system 622. The individual users 616 or groups of users 616 may also authorize collection of the user data 730 during use of the facility 602 or access to user data 730 obtained from other systems. For example, the user 616 may opt-in to collection of the user data 730 to receive enhanced services while using the facility 602.

In some implementations, the user data 730 may include information designating a user 616 for special handling. For example, the user data 730 may indicate that a particular user 616 has been associated with an increased number of errors with respect to output data 626. The inventory management system 716 may be configured to use this information to apply additional scrutiny to the events 624 associated with this user 616. For example, events 624 that include an item 604 having a cost or result above the threshold amount may be provided to the associates for processing regardless of the determined level of confidence in the output data 626 as generated by the automated system.

The inventory management system 716 may include one or more of a location component 732, identification component 734, event-determination component 736, and inquiry component 738, potentially amongst other components 756.

The location component 732 functions to locate items or users within the environment of the facility to allow the inventory management system 716 to assign certain events to the correct users. That is, the location component 732 may assign unique identifiers to users as they enter the facility and, with the users' consent, may locate the users throughout the facility 602 over the time they remain in the facility 602. The location component 732 may perform this locating using sensor data 724, such as the image data 726. For example, the location component 732 may receive the image data 726 and may use facial-recognition techniques to identify users from the images. After identifying a particular user within the facility, the location component 732 may then locate the user within the images as the user moves throughout the facility 602. Further, should the location component 732 temporarily "lose" a particular user, the location component 732 may again attempt to identify the users within the facility based on facial recognition, and/or using other techniques such as voice recognition, or the like.

Therefore, upon receiving the indication of the time and location of the event in question, the location component 732 may query the data store 718 to determine which one or more users were at or within a threshold distance of the location of the event at the particular time of the event. Further, the location component 732 may assign different confidence levels to different users, with the confidence levels indicating how likely it is that each corresponding user is the user that is in fact associated with the event of interest.

The location component 732 may access the sensor data 724 in order to determine this location data of the user and/or items. The location data provides information indicative of a location of an object, such as the item 604, the user 616, the tote 618, and so forth. The location may be absolute with respect to the facility 602 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 602, 5.2 m from an inventory location 614 along a heading of 169°, and so forth. For example, the location data may indicate that the user 616(1) is 25.2 m along the aisle 612(1) and standing in front of the inventory location 614. In comparison, a relative location may indicate that the user 616(1) is 32 cm from the tote 618 at a heading of 73° with respect to the tote 118. The location data may include orientation information, such as which direction the user 616 is facing. The orientation may be determined by the relative direction the user's 916 body is facing. In some implementations, the orientation may be relative to the interface device. Continuing the example, the location data may indicate that the user 616(1) is oriented with a heading of 0°, or looking north. In another example, the location data may indicate that the user 616 is facing towards the interface device.

The identification component 734 is configured to identify an object. In one implementation, the identification component 734 may be configured to identify an item 604.

In another implementation, the identification component 734 may be configured to identify the user 616. For example, the identification component 734 may use facial recognition techniques to process the image data 726 and determine the identity data of the user 616 depicted in the images by comparing the characteristics in the image data 726 with previously stored results. The identification component 734 may also access data from other sensors 620, such as from an RFID reader 920, an RF receiver 920, fingerprint sensors, and so forth.

The event-determination component 736 is configured to process the sensor data 724 and generate output data 726, and may include the components described above with reference to FIGS. 1 and 3. The event-determination component 736 may access information stored in the data store 718 including, but not limited to, event description data 742, confidence levels 744, or threshold values 746. In some instances, the event-determination component 736 may be configured to perform some or all of the techniques described above with regards to the event-determination component 106. For instance, the event-determination component 736 may be configured to create and utilize event classifiers for identifying events (e.g., predefined activity) within image data, potentially without use of other sensor data acquired by other sensors in the environment.

The event description data 742 comprises information indicative of one or more events 624. For example, the event description data 742 may comprise predefined profiles that designate movement of an item 604 from an inventory location 614 with the event 624 of "pick". The event description data 742 may be manually generated or automatically generated. The event description data 742 may include data indicative of triggers associated with events occurring in the facility 602. An event may be determined as occurring upon detection of the trigger. For example, sensor data 724 such as a change in weight from a weight sensor 620(6) at an inventory location 614 may trigger detection of an event of an item 604 being added or removed from the inventory location 614. In another example, the trigger may comprise an image of the user 616 reaching a hand toward the inventory location 614. In yet another example, the trigger may comprise two or more users 616 approaching to within a threshold distance of one another.

The event-determination component 736 may process the sensor data 724 using one or more techniques including, but not limited to, artificial neural networks, classifiers, decision trees, support vector machines, Bayesian networks, and so forth. For example, the event-determination component 736 may use a decision tree to determine occurrence of the "pick" event 624 based on sensor data 724. The event-determination component 736 may further use the sensor data 724 to determine one or more tentative results 748. The one or more tentative results 748 comprise data associated with the event 624. For example, where the event 624 comprises a disambiguation of users 616, the tentative results 748 may comprise a list of possible user 616 identities. In another example, where the event 624 comprises a disambiguation between items 104, the tentative results 748 may comprise a list of possible item identifiers. In some implementations, the tentative result 748 may indicate the possible action. For example, the action may comprise the user 616 picking, placing, moving an item 604, damaging an item 604, providing gestural input, and so forth.

In some implementations, the tentative results 748 may be generated by other components. For example, the tentative results 748 such as one or more possible identities or locations of the user 616 involved in the event 624 may be generated by the location component 732. In another example, the tentative results 748 such as possible items 604 that may have been involved in the event 624 may be generated by the identification component 734.

The event-determination component 736 may be configured to provide a confidence level 744 associated with the determination of the tentative results 748. The confidence level 744 provides indicia as to the expected level of accuracy of the tentative result 748. For example, a low confidence level 744 may indicate that the tentative result 748 has a low probability of corresponding to the actual circumstances of the event 624. In comparison, a high confidence level 744 may indicate that the tentative result 748 has a high probability of corresponding to the actual circumstances of the event 624.

In some implementations, the tentative results 748 having confidence levels 744 that exceed the threshold may be deemed to be sufficiently accurate and thus may be used as the output data 626. For example, the event-determination component 736 may provide tentative results 748 indicative of the three possible items 604(1), 904(2), and 904(3) corresponding to the "pick" event 624. The confidence levels 744 associated with the possible items 604(1), 904(2), and 904(3) may be 25%, 70%, 92%, respectively. Continuing the example, the threshold result 396 may be set such that confidence level 744 of 90% are deemed to be sufficiently accurate. As a result, the event-determination component 736 may designate the "pick" event 624 as involving item 604(3).

The inquiry component 738 may be configured to use at least a portion of the sensor data 724 associated with the event 624 to generate inquiry data 750. In some implementations, the inquiry data 750 may include one or more of the tentative results 748 or supplemental data 752. The inquiry component 738 may be configured to provide inquiry data 750 to one or more devices associated with one or more human associates.

An associate user interface is presented on the respective devices of associates. The associate may generate response data 754 by selecting a particular tentative result 748, entering new information, indicating that they are unable to answer the inquiry, and so forth.

The supplemental data 752 comprises information associated with the event 624 or that may be useful in interpreting the sensor data 724. For example, the supplemental data 752 may comprise previously stored images of the items 604. In another example, the supplemental data 752 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 626 during presentation to an associate.

The inquiry component 738 processes the response data 754 provided by the one or more associates. The processing may include calculating one or more statistical results associated with the response data 754. For example, statistical results may include a count of the number of times associates selected a particular tentative result 748, determination of a percentage of the associates that selected a particular tentative result 748, and so forth.

The inquiry component 738 is configured to generate the output data 626 based at least in part on the response data 754. For example, given that a majority of the associates returned response data 754 indicating that the item 604 associated with the "pick" event 624 is item 604(5), the output data 626 may indicate that the item 604(5) was picked.

The inquiry component 738 may be configured to selectively distribute inquiries to particular associates. For example, some associates may be better suited to answering particular types of inquiries. Performance data, such as statistical data about the performance of the associates, may be determined by the inquiry component 738 from the response data 754 provided by the associates. For example, information indicative of a percentage of different inquiries in which the particular associate selected response data 754 that disagreed with the majority of associates may be maintained. In some implementations, test or practice inquiry data 750 having a previously known correct answer may be provided to the associate for training or quality assurance purposes. The determination of the set of associates to use may be based at least in part on the performance data.

By using the inquiry component 738, the event-determination component 736 may be able to provide high reliability output data 626 that accurately represents the event 624. The output data 626 generated by the inquiry component 738 from the response data 754 may also be used to further train the automated systems used by the inventory management system 716. For example, the sensor data 724 and the output data 626, based on response data 754, may be provided to one or more of the components of the inventory management system 716 for training in process improvement. Continuing the example, this information may be provided to an artificial neural network, Bayesian network, and so forth, to further train these systems such that the confidence level 744 and the tentative results 748 produced in the future for the same or similar input is improved. Finally, as FIG. 7 illustrates, the servers 632 may store and/or utilize other data 758.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. One or more computing devices, comprising:
   one or more processors;
   memory;
   a feature-generation component, stored in the memory and executable on the one or more processors to:
      receive image data from one or more cameras in an environment, the image data representing a user interacting with an item in the environment; and
      generate, using the image data, feature data associated with at least one of the user or the item, the feature data comprising:
         a segmentation map indicating at least a first location of a hand of the user;
         a customer-interaction score map indicating that a second location of the image data represents an interaction between the hand of the user and the item; and
         at least one of a direction or velocity of the hand of the user in the image data;
   an interaction-detection component, stored in the memory and executable on the one or more processors to:
      receive the feature data;
      input the feature data into a first classifier that has been trained, using first training data, to determine whether the image data represents the interaction between the user and the item; and
      generate, using the first classifier and based at least in part on inputting the feature data to the first classifier, first data indicating at least a first time-range of the interaction and a third location of the interaction;
   a hypothesis-generation component, stored in the memory and executable on the one or more processors to:
      receive the first data;
      input the first data into a second classifier that has been trained, using second training data, to determine whether the interaction corresponds to at least one predefined activity of multiple predefined activities;

determine, using the second classifier and based at least in part on inputting the first data to the second classifier, that the image data represents a first predefined activity of the multiple predefined activities;

receive second data associated with a virtual cart of the user;

input the first data and the second data into a third classifier to determine a location of the first predefined activity, an action taken with respect to the item, and an identity of the item; and generate, using the third classifier, third data indicating at least a second time-range of the first predefined activity, a fourth location of the first predefined activity, the action taken by the user with respect to the item, and the identity of the item; and a virtual-cart component, stored in the memory and executable on the one or more processors to:

receive the third data; and automatically update the virtual cart associated with the user in response to generating the third data to indicate the identity of the item and the action taken with respect to the item.

2. The one or more computing devices as recited in claim 1, wherein the user comprises a first user, the item comprises a first item, the action comprises a first action, the identity comprises a first identity, and the hypothesis-generation component is further executable on the one or more processors to:

identify a second predefined activity based at least in part on the first data; and generate fourth data indicative of the second predefined activity, the fourth data indicating at least a third time-range of the second predefined activity, a fifth location of the second predefined activity, a second action taken by a second user with respective to a second item, and a second identity of the second item.

3. The one or more computing devices as recited in claim 1, wherein the feature data further comprises a state of the hand of the user, the state indicating that the hand was empty while moving towards the item.

4. The one or more computing devices as recited in claim 1, wherein the feature data indicates at least one of:

that the hand of the user was empty while moving towards an inventory location and that the hand of the user held the item while moving away from the inventory location;

that the hand of the user held the item while moving towards the inventory location and the hand of the user was empty while moving away from the inventory location;

that the hand of the user was empty while moving towards the inventory location and the hand of the user was empty while moving away from the inventory location; or that the hand of the user held the item while moving towards the inventory location and the hand of the user held the item while moving away from the inventory location.

5. The one or more computing devices as recited in claim 1, wherein the feature data comprises an indication of a fourth location of a head of the user in the image data, a fifth location of the hand of the user in the image data, and a sixth location of the item being held by the user in the image data.

6. The one or more computing devices as recited in claim 1, wherein the feature data comprises a first indication of a first state of an inventory location at a first time and a second indication of a second state of the inventory location at a second time that is later than the first time, the inventory location holding one or more items in the environment.

7. A method comprising:

generating, using one or more cameras in an environment that includes inventory locations holding items, image data representing a user in the environment;

generating feature data using the image data, the feature data comprising:

a segmentation map indicating at least a first location of a hand of the user;

a customer-interaction score map indicating that a second location of the image data represents an interaction between the user and an item; and an indication of at least one of a direction or velocity of the hand of the user in the image data over time;

inputting the feature data into a first classifier that has been trained, using first training data, to determine whether the image data represents the interaction between the user and the item;

generating, using the first classifier and based at least in part on inputting the feature data to the first classifier, interaction data indicative of a first interaction between the user and the item, the interaction data indicating a time-range of interest of the image data and at least one inventory location of interest of the environment;

inputting the interaction data into a second classifier that has been trained, using second training data, to determine whether the first interaction corresponds to a predefined activity in the environment;

determining, using the second classifier and based at least in part on inputting the interaction data to the second classifier, that the image data represents the predefined activity in the environment, the predefined activity comprising a performance of an action in the environment with respect to a first item at the at least one inventory location of interest;

receiving virtual-cart data representing a current state of a virtual cart of the user;

inputting the interaction data and the virtual-cart data into a third classifier to determine the action performed by the user and an identity of the first item;

generating, using the third classifier and based at least in part on inputting the interaction data and the virtual-cart data into the third classifier, event data indicating the action performed by the user and the identity of the first item; and automatically updating the virtual cart of the user at least partly in response to the generating of the event data to indicate the action performed by the user and the identity of the first item.

8. The method as recited in claim 7, wherein the interaction score map further indicates that a third location of the image data does not represent the interaction between the user and the item.

9. The method as recited in claim 7, wherein the feature data indicates at least one of:

that the hand of the user was empty while moving towards an inventory location and that the hand of the user held the item while moving away from the inventory location;

that the hand of the user held the item while moving towards the inventory location and the hand of the user was empty while moving away from the inventory location;

that the hand of the user was empty while moving towards the inventory location and the hand of the user was empty while moving away from the inventory location; or that the hand of the user held the item while moving towards the inventory location and the hand of the user held the item while moving away from the inventory location.

10. The method as recited in claim 7, wherein the feature data comprises an indication of a third location of a head of the user in the image data, a fourth location of the hand of the user in the image data, and a fifth location of the item being held by the user in the image data.

11. The method as recited in claim 7, wherein the feature data comprises a first indication of a first state of an inventory location at a first time and a second indication of a second state of the inventory location at a second time that is later than the first time, the inventory location holding one or more items in the environment.

12. The method as recited in claim 7, wherein the predefined activity comprises a first predefined activity, the event data comprises first event data, the user comprises a first user, the action comprises a first action, the identity of the first item comprises a first identity, and the method further comprises:
  determining, based at least in part on the interaction data, that a second predefined activity occurred in the environment, the second predefined activity comprising a second user performing a second action in the environment with respect to a second item in the environment; and
  generating second event data based at least in part on the determining that the second predefined activity occurred, the second event data indicating the second action performed by the second user and a second identity of the second item.

13. The method as recited in claim 7, wherein the generating the event data further comprises generating the event data indicating a start time of the action performed by the user, an end time of the action performed by the user, and a quantity of the first item involved in the action performed by the user.

14. A system comprising:
  one or more cameras to generate image data of an environment that includes inventory locations holding items, the image data representing a user in the environment;
  one or more processors; and
  one or more computer-readable media storing computer-executable instructions that, when executed, cause the one or more processors to perform acts comprising:
    generating feature data using the image data, the feature data comprising:
      a segmentation map indicating at least a first location of a hand of the user;
      a customer-interaction score map indicating that a second location of the image data represents an interaction between the user and an item; and
      an indication of at least one of direction or velocity of the hand of the user in the image data over time;
    inputting the feature data into a first classifier that has been trained, using first training data, to determine whether the image data represents the interaction between the user and the item;
    generating, using the first classifier and based at least in part on inputting the feature data to the first classifier, interaction data indicative of a first interaction between the user and the item, the interaction data indicating a time-range of interest of the image data and at least one inventory location of interest of the environment;
    inputting the interaction data into a second classifier that has been trained, using second training data, to determine whether the first interaction corresponds to a predefined activity in the environment;
    determining, using the second classifier and based at least in part on inputting the interaction data to the second classifier, that the image data represents the predefined activity in the environment, the predefined activity comprising a performance of an action in the environment with respect to a first item at the at least one inventory location of interest;
    receiving virtual-cart data representing a current state of a virtual cart of the user;
    inputting the interaction data and the virtual-cart data into a third classifier to determine the action performed by the user and an identity of the first item;
    generating, using the third classifier and based at least in part on inputting the interaction data and the virtual-cart data into the third classifier, event data indicating the action performed by the user and the identity of the first item; and
    automatically updating the virtual cart of the user at least partly in response to the generating of the event data to indicate the action performed by the user and the identity of the first item.

15. The system as recited in claim 14, wherein the customer-interaction score map further indicates that a third location of the image data does not represent the interaction between the user and the item.

16. The system as recited in claim 14, wherein the feature data indicates at least one of:
  that the hand of the user was empty while moving towards an inventory location and that the hand of the user held the item while moving away from the inventory location;
  that the hand of the user held the item while moving towards the inventory location and the hand of the user was empty while moving away from the inventory location;
  that the hand of the user was empty while moving towards the inventory location and the hand of the user was empty while moving away from the inventory location; or
  that the hand of the user held the item while moving towards the inventory location and the hand of the user held the item while moving away from the inventory location.

17. The system as recited in claim 14, wherein the indication is a first indication and the feature data comprises a second indication of a third location of a head of the user in the image data, a fourth location of a hand of the user in the image data, and a fifth location of an item being held by the user in the image data.

18. The system as recited in claim 14, wherein the indication is a first indication and the feature data comprises a second indication of a first state of an inventory location at a first time and a third indication of a second state of the inventory location at a second time that is later than the first time, the inventory location holding one or more items in the environment.

19. The system as recited in claim 14, wherein the predefined activity comprises a first predefined activity, the event data comprises first event data, the user comprises a first user, the action comprises a first action, the identity of the first item comprises a first identity, and the computer-readable media further stores computer-executable instructions that, when executed, cause the one or more processors to perform acts comprising:

determining, based at least in part on the interaction data, that a second predefined activity occurred in the environment, the second predefined activity comprising a second user performing a second action in the environment with respect to a second item in the environment;

generating second event data based at least in part on the determining that the second predefined activity occurred, the second event data indicating the second action performed by the second user and a second identity of the second item; and updating a state of a second virtual cart of the second user based at least in part on the second event data.

20. The system as recited in claim 14, wherein the generating the event data further comprises generating the event data indicating a start time of the action performed by the user, an end time of the action performed by the user, and a quantity of the first item involved in the action performed by the user.

* * * * *